June 10, 1924.　　　　　　　　　　　　　　　　　　　1,496,832
J. P. SHAMBERGER ET AL
UNIVERSAL SPUR GEAR
Filed Nov. 20, 1923
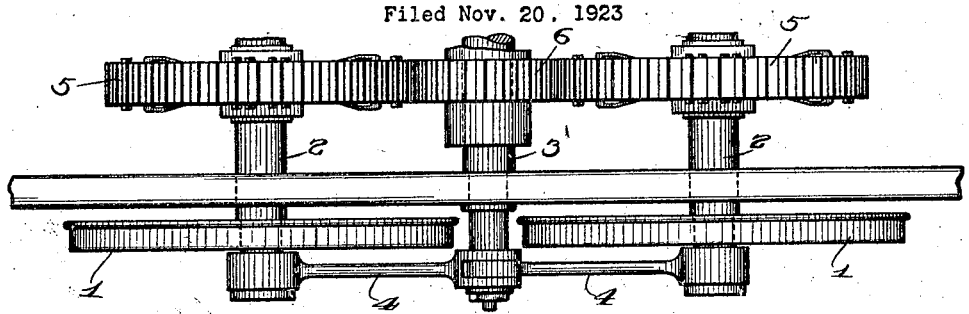
Fig. 1.
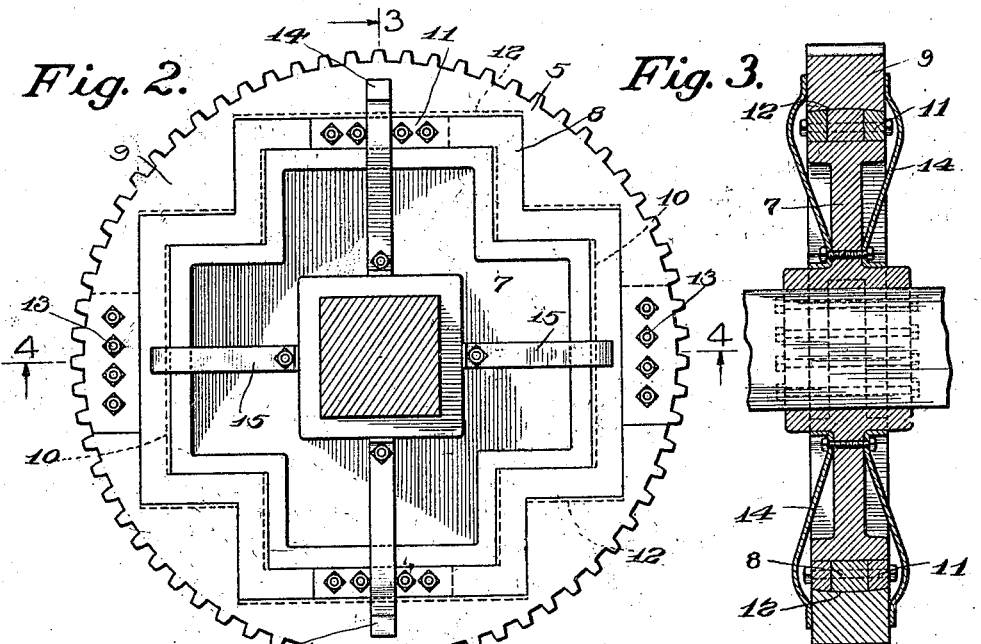
Fig. 2.　　　　　　　　　　　　　Fig. 3.
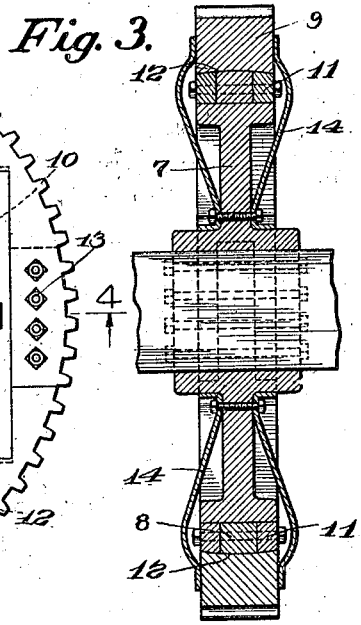
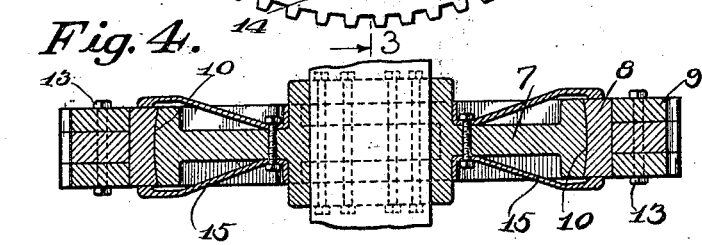
Fig. 4.
Inventors
JOHN PAUL SHAMBERGER
CLARENCE H. SLAYTON
By Eccleston & Eccleston
Attorneys.

Patented June 10, 1924.

1,496,832

UNITED STATES PATENT OFFICE.

JOHN PAUL SHAMBERGER AND CLARENCE H. SLAYTON, OF OMAHA, NEBRASKA.

UNIVERSAL SPUR GEAR.

Application filed November 20, 1923. Serial No. 675,857.

*To all whom it may concern:*

Be it known that we, JOHN PAUL SHAMBERGER and CLARENCE HARVEY SLAYTON, citizens of the United States, and residents of Omaha, in the county of Douglas and State of Nebraska, have invented certain new and useful Improvements in Universal Spur Gears, of which the following is a full, clear, and exact description.

Our invention relates to a gear wheel so constructed as to permit a perfect mesh between the teeth thereof and a cooperating gear even though the angle between the plane of the gear wheel and the plane of its shaft may vary, and has for its object to provide such a wheel which is substantially as strong as solid gear wheels or other gear wheels in which a universal adjustment is absent.

Other objects and advantages of the invention will be apparent to those skilled in the art from the following description taken in connection with the accompanying drawings in which, Figure 1 is a fragmentary plan view of a locomotive truck with the universal gear wheel in cooperation therewith.

Figure 2 is a side elevation of the gear wheel.

Figures 3 and 4 are transverse sections through the gear wheel taken on lines 3—3 and 4—4 respectively.

Referring to the drawings in detail the numeral 1 designates the drive wheels of an electric locomotive or other truck and which are mounted on the drive shafts thereof 2. These shafts are maintained at a fixed distance from the jack shaft 3 by means of drive rods 4, and also have mounted thereon the universal gear wheels 5 which cooperate with the gear wheel 6 carried by jack shaft 3.

In trucks of this type it is obvious that the driving axle may move from the horizontal plane a degree different from the degree of movement of the jack shaft. It therefore becomes necessary to provide a gear wheel of such flexibility that it may remain in full toothed engagement with the gear wheel on the jack shaft and yet be fixed with relation to the driving axle. To this end the universal gear wheel 5 is built up of three sections, namely the inner or hub section 7, the intermediate section 8, and the outer or toothed section 9.

The hub section 7 is provided with a squared hub which is fitted to a squared portion of the jack shaft 3 as shown in Figure 2. The section 7 is in the form of a Greek cross, although some other irregular form might be used. The opposed outer edges of the section 7 (in one direction) are beveled or rounded as indicated at 10 in Figures 2 and 4, and have seated thereon the similarly curved inner edges of the intermediate section 8; this intermediate section being formed of duplicate members bolted together as indicated at 11 in Figure 3. Two of the opposed outer edges of the intermediate section 8, are curved or beveled as shown at 12 in Figures 2 and 3. It should be noted, however, that the pairs of opposed curved surfaces of the intermediate section are at right angles to each other. The outer or toothed section 9 is composed of two similar sections bolted together as indicated at 13 and also has two of its inner opposed surfaces curved so as to snugly fit upon the outer curved surfaces of the intermediate section.

From the construction thus far described it will be apparent that a practically solid wheel has been built up which will permit of a universal lateral movement of its outer or tooth carrying rim, thereby allowing the teeth to remain in full engagement with the teeth of a cooperating gear wheel irrespective of whether or not the axles remain in their normal positions.

In order that the several sections of the universal gear may normally be maintained in a single plane we have provided pairs of leaf springs 14—14 and 15—15 which are bolted to the inner section 7 of the wheel and have their outer ends in engagement with the sides of the outer and intermediate sections respectively.

In accordance with the patent statutes we have described what we now believe to be the best embodiment of the invention, but we do not wish to be understood thereby as limiting ourselves or the scope of the invention, as many changes and modifications may be made without departing from the spirit of the invention; all such we aim to include in the scope of the appended claims.

What we claim as new and desire to secure by Letters Patent is:

1. A gear wheel formed of inner, outer, and intermediate sections of irregular contour certain of the contacting edges of the sections being constructed and arranged to permit a lateral movement of the toothed or outer section with respect to its adjacent section.

2. A gear wheel formed of inner, outer and intermediate sections of irregular contour and normally in the same plane certain of the contacting edges of the sections being constructed and arranged to permit a universal movement of the toothed or outer section.

3. A gear wheel formed of inner, outer and intermediate sections of irregular contour, certain of the contacting edges of the sections being curved to permit a relative lateral movement between the sections.

4. A gear wheel formed of inner, outer and intermediate laterally movable sections arranged in a single plane, and means for normally maintaining said sections in a single plane.

5. A gear wheel formed of a plurality of laterally movable sections arranged in a single plane, and resilient means for normally maintaining said sections in a single plane.

6. A gear wheel formed of a plurality of laterally movable sections arranged in a single plane, and a plurality of leaf springs secured to one of said sections and engaging the sides of another section for normally maintaining said sections in a single plane.

7. A gear wheel formed of inner, intermediate and outer sections constructed and arranged for lateral movement, and pairs of leaf springs secured to the inner section, certain of said pairs of springs having their free ends engaging the sides of the intermediate section and the remaining pairs of springs having their free ends engaging the sides of the outer section.

8. A gear wheel formed of inner, intermediate and outer sections, certain of the contacting surfaces of the inner and intermediate sections being laterally curved, and certain of the contacting surfaces of the intermediate and outer sections having their contacting surfaces laterally curved.

9. A gear wheel comprising inner, intermediate and outer sections arranged in a single plane, the inner section being in the shape of a cross and having certain of its outer edges rounded, the intermediate section being in the shape of a cross and having certain of its inner and outer edges rounded, and the outer section having its inner edge in the shape of a cross and certain portions thereof rounded.

10. A gear wheel comprising inner, intermediate and outer sections arranged in a single plane, the inner section being in the shape of a cross and having certain of its outer edges rounded, the intermediate section being in the shape of a cross and having certain of its inner and outer edges rounded, the outer section having its inner edge in the shape of a cross and certain portions thereof rounded, and means for normally maintaining said sections in a single plane.

JOHN PAUL SHAMBERGER.
CLARENCE H. SLAYTON.